May 18, 1926.

S. PORTE

BRACELET

Filed Feb. 23, 1923

1,585,107

INVENTOR
SAMUEL PORTE.

BY
ATTYS.

Patented May 18, 1926.

1,585,107

UNITED STATES PATENT OFFICE.

SAMUEL PORTE, OF SYDNEY, NOVA SCOTIA, CANADA.

BRACELET.

Application filed February 23, 1923. Serial No. 620,815.

This invention relates to improvements in bracelets, particularly spring-linked bracelets, and the objects of the invention are generally to improve and simplify a bracelet of this character to better adapt the various parts to perform the functions required of them.

In its construction the invention includes the improved combination and arrangement of parts hereinafter described in detail in the present specification and illustrated in the accompanying drawings.

In the drawings.

In the drawings, like characters of reference indicate corresponding parts in all the figures.

Figure 1:
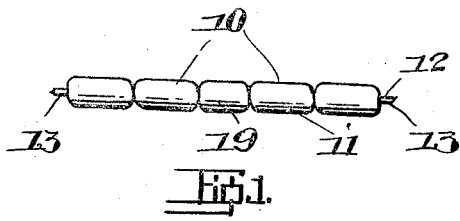
Figure 1 is a top plan view of an embodiment of the invention.
Figure 2:
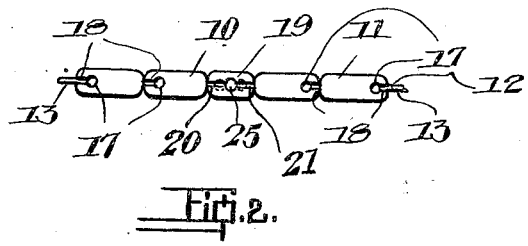
Figure 2 is a view of the underside.
Figure 4:
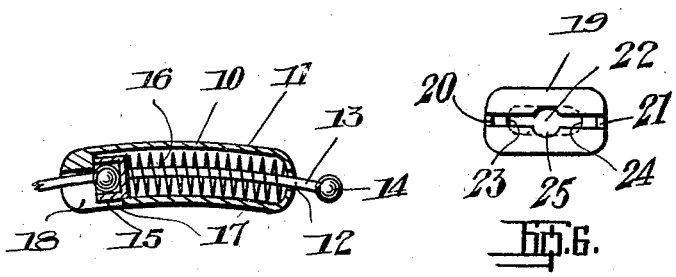
Figure 4 is an enlarged view of one of the links.
Figure 6:
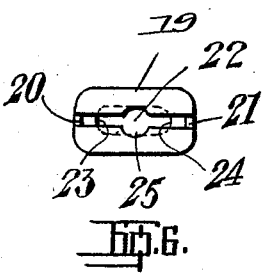
Figure 6 is a plan view of the underside of the connecting link.

Referring to the drawings:

The bracelet comprises a plurality of links 10 each having a cylindrical containing member 11 and a connecting member 12 formed with a shank 13 having a spherical enlargement 14 at one end and a socket 15 at the opposite end designed to fit the spherical enlargement on the adjacent member, as shown in Figure 4.

The member 13 is designed to slide within the member 11, being spring-held in normal position by a spring 16 which extends between the socket 15 and the inner end of the members 11 and 12 surrounding the stem 13.

When the socket 15 is freed from the enlargement or head 14, the enlargement or head is designed to be removed through an opening 17 in the member 11, preferably of spherical shape and communicating with a slot 18 through which the stem 13 may pass. When the head is in the socket, it will be seen that the links are locked together, but when withdrawn therefrom, the links may be separated.

Figure 3:
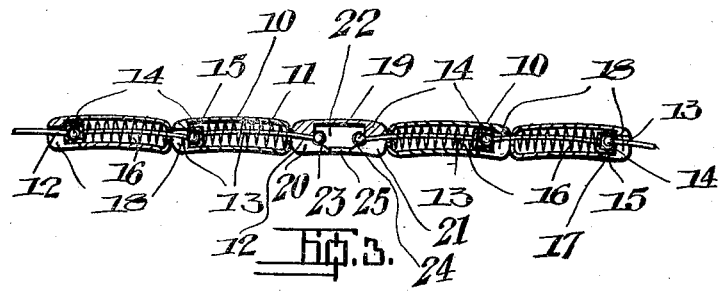
Figure 3 is an enlarged sectional detail.
Figure 5:
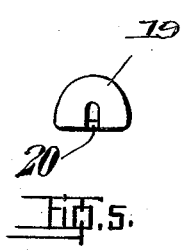
Figure 5 is an end view of the connecting link.

The ends of the bracelet are conveniently connected together by a connector member 19, being formed at opposite ends with slots 20 and 21 through which stems 13 of the links 10 may extend, the heads 14 on said end members passing into a central recess 22, in the form shown in Figure 3, said recess being provided with bevel faces 23 and 24 leading to the opening 25 through which the heads are introduced.

In operation, the link casing members 10, having been fitted with spring-actuated connecting bars or rods 12, are joined together by sliding the members 12 within the casing to engage with the protruding socket end of the bar in the adjacent casing. A slot 18 is provided in the casing through which, when the socket 15 is freed from the ball 14, the latter is adapted to be removed.

What I claim as my invention is:

A bracelet comprising a plurality of links each consisting of a casing, a connecting rod ball-formed at one end and having a socket at the other end, the ball end being designed to protrude beyond the casing to engage with the socket end of a similar connecting rod in the adjacent link casing, an expansible spring surrounding said rod and a slot in the casing, the socket end of the connecting rod being within the casing and designed to press the spring against the end of the casing.

In witness whereof I have hereunto set my hand.

SAMUEL PORTE.